United States Patent [19]
Lotzgesell et al.

[11] 3,975,206
[45] Aug. 17, 1976

[54] METHOD OF PEROXIDE THINNING GRANULAR STARCH

[75] Inventors: James A. Lotzgesell; Kenneth B. Moser; Thomas L. Hurst, all of Decatur, Ill.

[73] Assignee: A. E. Staley Manufacturing Company, Decatur, Ill.

[22] Filed: Nov. 18, 1974

[21] Appl. No.: 524,727

[52] U.S. Cl................................ 127/71; 127/70; 536/102
[51] Int. Cl.$^2$.................. C08B 31/18; C13L 1/08
[58] Field of Search............................. 127/70, 71; 260/233.3 R

[56] References Cited
UNITED STATES PATENTS

| | | | |
|---|---|---|---|
| 3,058,853 | 10/1962 | Wurzburg | 127/71 X |
| 3,475,215 | 10/1969 | Maurer | 127/70 X |
| B408,030 | 1/1975 | Speakman | 260/233.3 R |

OTHER PUBLICATIONS

The Hydrolysis of Starch by $H_2O_2$ and Ferrous Sulfate, Jnl. Biological Chemistry, vol. 113, pp. 417–425 (1936).

Merck Index, Eighth Edition, p. 955.

C.A. 46: 11117h, The Action of Iron and Hydrogen Peroxide on Polysaccharides, 1952.

Primary Examiner—Morris O. Wolk
Assistant Examiner—Michael S. Marcus
Attorney, Agent, or Firm—Howard J. Barnett; Charles J. Meyerson

[57] ABSTRACT

An improved method for thinning starch in the granular state employing hydrogen peroxide and metal ion catalysts in an aqueous suspension, free of buffer additions. The thinning action proceeds in acid pH to the desired viscosity level, and is stopped by the addition of sodium metabisulfite, or other reducing agent to remove residual hydrogen peroxide. The aqueous suspension is then neutralized, and the usual purifying and drying steps are effected on the granular product.

11 Claims, No Drawings

METHOD OF PEROXIDE THINNING GRANULAR STARCH

BACKGROUND OF THE INVENTION

Typically, starch is subjected to thinning action by mineral acids and by oxidative thinning with sodium hypochlorite. The object of these thinning methods is to obtain a starch having modified viscosity characteristics, but not so completely thinned that it is water soluble. Such reactions are usually performed on the granular state, and usually in a slurry suspension. The starch products resulting from the slurry reaction are conveniently filtered and washed to remove water soluble impurities and salt resulting from the reaction.

There are two problems associated with acid thinning and sodium hypochlorite oxidative thinning. At the present time, mineral acids and sodium hypochlorite are in short supply due to chemical shortages. In addition, both of these processes inherently generate inorganic salts which are discharged as effluents from the starch processing facility. In some cases, the cumulative effect of all sewage effluents from a manufacturing facility may exceed the amount permissible by law. In such cases, it is desirable to limit such effluents where practical to permit a greater volume of manufacturing of other products in which effluents cannot be avoided.

Since both mineral acid thinning and sodium hypochlorite oxidative thinning result in organic and inorganic salt by-products, which do increase the effluent load for a manufacturing facility, a search was made to find another means of accomplishing the thinning desired for a particular starch derivative, and which would minimize the amount of by-product salts which would be discharged into the sewer. This investigation led to the consideration of the use of hydrogen peroxide as an oxidative thinning agent.

DESCRIPTION OF THE PRIOR ART

The possibility of reacting starch with hydrogen peroxide in the presence of ferrous and ferric salts was described by T. Omori in 1931, Subject: *Heavy Metal Catalysts of Biological Interest*, Jnl. Biochemistry, Vol. XIV, No. 2, pp. 331–337 (1931). Omori's observations confirmed that both the ferrous and ferric ions were useful in catalyzing the hydrogen peroxide reaction with starch. For his purposes, the reaction temperature was about 50°C., and the solution was acetate buffered to a pH of 3.6, and he used a 0.5% starch solution (1 ccm) with a 1M $H_2O_2$ solution (0.1 ccm) which calculates to a ratio of about 4 parts hydrogen peroxide to 5 parts starch, dry solids basis. Omori concluded that the heavy metal/hydrogen peroxide/starch system, although it accomplished hydrolysis of the starch, was different than the action of enzyme systems on starch.

W. R. Brown commented on the work by Omori, and did additional experiments, using a ratio of one part hydrogen peroxide to one part of starch. See *The Hydrolysis of Starch by Hydrogen Peroxide and Ferrous Sulfate*, Jnl. Biological Chemistry, Vol. 113, pp. 417–425 (1936). Contrary to the observation made by Omori, Brown stated that the reaction is a true hydrolysis, analogous to enzyme hydrolysis. He observed that the simple sugars produced in his examples were further hydrolyzed and oxidized to acids and aldehydes. He also observed that iron by itself did not split the starch effectively, and he concluded that the iron metal ion acted as a catalyst.

Brown postulated the following theory for the catalytic action of the ferrous or ferric ions in combination with the hydrogen peroxide. The iron first forms an unstable combination with the starch through the oxygen or glucoside linkages. This raises the energy of the starch molecule thereby making it more reactive, and as the hydrogen peroxide decomposition proceeds, it produces large amounts of energy which is absorbed to activate the iron. This energy is then transferred to the starch, which is then capable of reacting with water to be hydrolyzed quite rapidly. The reaction continues as the iron takes up more energy from the continued decomposition of additional hydrogen peroxide. The amount of hydrogen peroxide present in the system limits the supply of energy available for the continuing reaction.

In his experiments, Brown used one part of hydrogen peroxide to one part of starch, and an acetate buffer of pH 3.8. The temperature was 37°C. Brown made no attempt to preserve a granular product, but continued the hydrolysis to the point where water soluble dextrins resulted, and these were precipitated from the reaction mixture by the use of ethy alcohol.

U.S. Pat. No. 2,268,215 discloses the use of calcium ion with peroxide radical for thinning a starch suspension. About 1.45 to 1.95% by weight calcium hydroperoxide is used, and it was observed that some unknown acetic residues in the starch molecule are capable of combining with the calcium ion. The patent states that the calcium metal ion then apparently forms an additional compound with the acetic residues of the starch molecule, and this chemical combination between the metal and the starch gives the modified starches thick setting characteristics. As a requirement, the patentee states that calcium peroxide or other alkaline earth peroxide (or substances yielding in solution alkaline earth ion and peroxide radicals) are required for the practice of this invention. In addition, the reaction is carried on in an alkaline media. The reaction is then neutralized with an acid capable of forming a water soluble salt with calcium, which is removed by water wash.

U.S. Pat. No. 2,307,684 is directed to the liquefication of starch using hydrogen peroxide catalyzed by a metal salt, or a metal such as copper or manganese. Sodium carbonate or other alkali is added to regulate the final or end pH of the liquefied starch. The initial pH of the reaction is preferably 9–10, and the reaction temperature is above the gel point of the starch.

An oxidative thinning process is described in U.S. Pat. No. 2,999,090, issued Sept. 5, 1961. In that patent, a hydroxyethyl starch is reslurried in water to a pH of at least 8, and then oxidized with an oxidizing agent which releases chlorine. Sodium hypochlorite is typical of such a reagent and is disclosed in the examples. Salt by-products are removed in the wash water when this product is purified.

Acetylation of starch using hydrogen peroxide in the presence of acetic anhydride and ferrous salts is described in U.S. Pat. No. 3,557,091. About 0.015 to 0.3% by weight hydrogen peroxide and 0.002 to 0.03% by weight ferrous sulfate are used, based on the weight of the starch, in an alkaline pH reaction. The purpose of the reaction is only to prepare the starches for enzyme hydrolysis. When the reaction is neutralized and washed, inorganic salts are removed, producing an increased effluent load.

H. W. Durand describes a derivatized starch thinning using hydrogen peroxide with a copper ion catalyst in U.S. Pat. No. 3,655,644. The reaction is conducted in an alkaline pH media, preferably around 11.3. When the reaction mixture is neutralized, inorganic salts are formed and washed away as an effluent.

SUMMARY OF THE INVENTION

This invention is directed to an improved process for oxidative thinning of starch employing hydrogen peroxide in combination with heavy metal catalysts such as iron, cobalt, copper or chromium. Iron salts, such as ferrous sulfate, are presently preferred because of their ready availability, lower cost, desirable reactivity and recognized safety in food products. These oxidatively thinned starch derivatives have properties similar to acid hydrolyzed starches, as well as properties of oxidized starches.

The subject thinning process is effective for any base starch, including cereal starches derived from corn, wheat, rice, barley and the like and root and root-type starches, such as those derived from potato, sago, waxy maize, waxy milo, tapioca and waxy sorghum. Starches derived from leguminous sources, such as yellow field pea and fava bean (Vicia fava) can also be utilized. The base starch may also be chemically modified, such as by the addition of cationic groups, anionic groups, etherification, esterification, and combinations of these. Only a very minor amount of iron is required to catalyze the hydrogen peroxide thinning reaction, and the reaction is preferably controlled to maintain the resulting product in a granular state. This is accomplished by maintaining lower temperatures below the gelatinizing temperature of the starch, and by stopping the reaction before the starch product becomes water soluble.

The oxidative thinning reaction of this invention requires only a short reaction time and because low reagent levels are sufficient, relatively larger batches of product may be made. Only a very low salt residue is washed out of the product, making possible increased plant capacity without significant increase in effluent levels.

The oxidative thinning process of this invention is suited to existing process equipment, so that additional capital investment is avoided. The resulting products have less set back than similar acid thinned starches without introducing the higher anionic character into the product, which is more typical of sodium hypochlorite oxidized starches.

The thinning reaction is easily controlled, because no additional catalyst is required to accomplish additional thinning. The reaction energy is supplied by the decomposition of hydrogen peroxide, and the reaction can be continued by merely adding additional hydrogen peroxide. When the desired fluidity level is obtained, the reaction can be stopped by removal of all remaining $H_2O_2$ by the addition of sodium metabisulfite, peroxidase, or other peroxide scavengers.

A combination of thinning methods is also possible in some cases. Partial thinning by hydrogen peroxide/ferrous sulfate system may be followed by a small amount of sodium hypochlorite oxidative thinning to achieve a desired effect, such as a whiter product. In some instances, some acid thinning may be desirable. Combinations of all known thinning methods are also possible; for example the particular product could also be subjected to some form of dextrinization.

It is presently estimated that the optimum iron concentration desirable is about 50 parts per million (0.005% iron based on the dry substance of the starch). This amount of metal iron gives an optimum thinning time of 2–5 hours. If too little iron is present a slow reaction results, in excess of 6 hours. If too much iron is present the hydrogen peroxide reacts out in ½ hour or less. When desired, the color of the resulting product can be improved by treating it with hypochlorite bleach (0.5% chlorine, $Cl_2$), and 0.1% dry solids basis ethylenediamine tetraacetic acid (EDTA) to remove residual iron.

DETAILED DESCRIPTION OF THE INVENTION

EXAMPLE I

Granular yellow dent corn starch was subjected to peroxide thinning in the presence of ferrous sulfate. In this example, 0.23%, calculated as pure hydrogen peroxide, and 0.03% dry solids basis (dsb) ferrous sulfate ($5H_2O$) based on the weight of the starch, were used. The reactions were run until essentially all of the peroxide was used up, which was established by testing with the acidic potassium iodide spot test. The extent of thinning accomplished was measured using a 9 gram dsb starch sample in 90 ml of 0.375 N sodium hydroxide solution and the alkali fluidity test procedure Number 2 described below (following Example 7).

Before running the reaction, the reaction mixtures were divided into two portions. One reaction mixture was adjusted from a pH of 4.9 up to 9.7 with sodium hydroxide, and the pH of this reaction mixture was maintained at about 9.7 throughout the reaction period. No pH adjustment was made on the second sample, and the pH of the sample went from 5.0 down to about 3.2 after the hydrogen peroxide was added. The alkaline reaction sample had an alkali fluidity of 22 ml. after the peroxide thinning was complete, which indicates a very inefficient thinning reaction. By comparison, the sample portion which was allowed to reach its natural pH level of 3.2 had an alkali fluidity valve of 71 ml., which demonstrates substantially more effective thinning action, using the same levels of $H_2O_2$. Residual hydrogen peroxide was removed by the addition of 0.05% dsb sodium metabisulfite, based on the weight of the starch. It is apparent that much of the hydrogen peroxide energy is wasted in the alkaline pH reaction medium. It has also been observed experimentally that starches of different origin require different amounts of peroxide and iron salts to obtain thinning to a desired fluidity level. As can be seen in the following example, waxy maize starch requires more peroxide and iron salt than yellow dent corn starch to obtain a desired thinning effect.

EXAMPLE II

A hydroxyethylated starch derivative, based on waxy maize starch was first made following any well-known method, including the general procedure described in U.S. Pat. No. 2,516,633 and 2,516,634. Seven thousand (7,000) g. dry solids basis of this modified starch derivative was slurried in 11,000 ml. of water. The target alkali fluidity for this thinned product, which was formerly acid-thinned using 1.0% dsb $H_2SO_4$, based on the weight of the starch, dry substance, was 62 ml. (4.5 g. dsb starch in 95 ml. of 0.25 N NaOH) following the alkali fluidity test procedure No. 1 set forth below (following Example 7).

The slurry was adjusted from a pH 6.5 to about 4.8 with about 15 ml. of 10% $H_2SO_4$, and was then heated to about 108°–112°F., 2.8 g. hydrate ($5H_2O$) of ferrous sulfate (0.04% dsb, based on the starch) was then added to the slurry, which was then stirred. Then 15.6 g. (15.5 ml.) of 30% hydrogen peroxide (5.6 g. dsb, 0.08% dsb) was added to the slurry, and the reaction was allowed to continue for approximately 19 hours at a temperature of about 108°F. During the reaction, the pH of the slurry was allowed to decrease without buffer additions to about 3.6. During the reaction, the alkali fluidity test was run at regular time intervals. Increasing alkali fluidity values showed that the hydrogen peroxide thinning action was proceeding.

After about 19 hours, 3.5 g. of sodium metabisulfite was added (0.5% dsb, based on the starch) to stop the hydrogen peroxide thinning action. The potassium iodide spot test for residual peroxide gave a colorless result, showing that all residual peroxide had been removed. The pH of the slurry was then adjusted upwardly from 3.6 to about 6.6 with about 50 ml. of 5% NaOH. Then 7 g. of ethylenediamine tetraacetic acid (E.D.T.A., 0.1%, dsb) was added to remove residual iron. The pH was then adjusted upwardly from 6.6 to 9.1 with about 130 ml. of 5% NaOH, and the slurry stirred for about 3 hours. The pH was then adjusted down from 9.2 to about 6.3 using 15 ml. of 30° Be. $H_2SO_4$. The slurry was then filtered with about 5600 ml. of water, washed and air dried. The final alkali fluidity of the product resulting from the above thinning method was 69 ml., as compared to a target fluidity of 62 ml., which demonstrates that even more thinning effect is obtained using 0.08% dsb hydrogen peroxide catalyzed with 0.05% dsb ferrous sulfate, than was formerly obtained using 1.0% dsb $H_2SO_4$, which added to the effluent load by discharging sulfate salts when the starch derivative product was washed. In high volume production facilities, the above decrease in effluent discharge becomes greatly amplified, and can mean the difference between achieving full volume production potential, and something less.

EXAMPLE III

An hydroxyethylated waxy maize starch derivative was thinned according to the following procedure. Eight (8) kg., dsb, of hydroxyethylated waxy maize starch was slurried in 11,900 ml. of water, the pH was adjusted from 6.2 down to 4.5 with about 19 ml. of 10% sulfuric acid solution. The slurry was then heated to a temperature range of 108°–112°F. and 3.2 g. hydrated ferrous sulfate ($5H_2O$.) was added and the pH adjusted to 4.4. Eighty (80) g. (24 g. dry solids, 0.3%, dsb) of 30% hydrogenperoxide was added at 108°F., and the slurry was stirred and allowed to react for about 4½ hours. The alkali fluidity was taken at regular intervals during the reaction to monitor the thinning action of the hydrogen peroxide. At 3 hours the alkali fluidity was 25 ml. for a 10 g. sample of starch (dsb) in 90 ml. of 0.375 N NaOH, following test procedure No. 2.

The same alkali fluidity test procedure and sample size and normality was used throughout the reaction to monitor the alkali fluidity, which increased in a direct relationship to the thinning effect of the hydrogen peroxide. After nine hours reaction time, the alkali fluidity appeared to stabilize at 65 ml., and an additional 2.4 g. of 30% hydrogen peroxide was added, and allowed to react for an additional 1½ hours, when the target fluidity of 70.5 ml. was attained.

A potassium iodide spot test showed light brown to medium brown, and 8 g. of sodium metabisulfite (0.1% dsb) in 250 ml. of water was added to stop the reaction. The potassium iodide spot test than showed colorless, which indicated that all residual hydrogen peroxide had been removed.

At this point, the pH of the reaction mixture was 2.5 and was then adjusted up to 6.8 with about 250 ml. of 5% sodium hydroxide. The reaction mixture was then stirred overnight at 108°F.

At the end of this stirring period the pH was 6.1 and 8 g. of ethylenediamine tetraacetic acid (E.D.T.A., 0.1%, dsb) was added to remove the residual ferrous sulfate from the reaction mixture. The pH was adjusted from 6.2 up to 9 with about 175 ml. of 5% sodium hydroxide, and stirring was continued for another 4½ hours. The pH was then 8.2 and was adjusted downwardly to 6.3 with about 7 ml. of 30° Be. sulfuric acid. The reaction mixture was then filtered with about 6400 ml. of wash water, and the cake was air dried. The resulting product was tested for pasting characteristics and viscosity and was found to have pasting and viscosity characteristics upon cooking which were equivalent to the similar hydroxyethylated starch derivative in which acid thinning was used. The above reaction required only about 0.36% hydrogen peroxide (calculated as 100%) to obtain the desired thinning effect, whereas the typical acid thinned product required 2.51% by weight dsb sulfuric acid to obtain the same target fluidity.

EXAMPLE IV

In this example, a target fluidity of 57–59 ml. was desired. A granular starch derivative similar to that described in Example III was used, also based on waxy maize and hydroxyethylated. 5,330 g. dsb of the hydroxyalkylated starch derivative was slurried in 8,000 ml. of water. The pH of the slurry was adjusted from 6.2 down to 4.2 with about 14.5 ml. of 10% sulfuric acid. The solution was then heated to a range of 108°–112°F. as before, and when the reaction mixture had reached a temperature of 104°F., 2.15 g. of ferrous sulfate (pentahydrate) (0.04% dsb) was added. Subsequently, 36 g. of 30% hydrogen peroxide (10.7 g. calculated at 100% $H_2O_2$) was added. This calculates to 0.20% of hydrogen peroxide based on the dry weight of the starch. The reaction mixture was stirred as before, and the alkali fluidity of the reaction mixture was charted during the reaction.

After the reaction had continued for about 10 hours with no additional hydrogen peroxide required, the target fluidity foor a 9 g. sample, dry solids starch, in 90 ml. of 0.375 N NaOH of 56.5 ml. was attained, following test procedure No. 2, The potassium iodide spot test showed tan to dark brown and 5.4 g. of sodium metabisulfite (0.1%, dsb) was added. The potassium iodide spot test was than colorless, indicating that all residual hydrogen peroxide had been removed.

The remaining steps of the procedure, including filtering, washing and pH adjustment were done as before. Only 0.20% hydrogen peroxide, based on the dry weight of the starch was required to accomplish the desired thinning effect. Formerly, 1.88% (as 100%) sulfuric acid, based on the dry weight of the starch was required to accomplish this same thinning effect as evidenced by the comparable alkali fluidity values for the thinned product. Also significant is the fact that the hydrogen peroxide creates no salt residue in the effluent from the manufacturing facility.

EXAMPLE V

The hydrogen peroxide thinning effect has also proved valuable in combination with sodium hypochlorite bleach in those products which require it. For example, in making a modified starch/copolymer adhesive, it was found that 0.80% $H_2O_2$ calculated at 100%, based on the weight of the starch, catalyzed by ferrous sulfate pentahydrate could be used in combination with NaOCl, and complete omission of acid thinning, to obtain the same thinning effect as that previously obtained using only acid thinning.

In this process, the thinning with hydrogen peroxide was completed prior to the starch modification and polymerization, and only the peroxide thinning step will be described here. A starch slurry is first made up at 22.5° Be. at about 70°F., and the temperature adjusted to about 108°–112°F. The slurry is then agitated at high speed and 0.08 lbs. of ferrous sulfate pentahydrate per 100 lbs. of dry substance starch is added, and mixed for 15 minutes. 2.3 lbs. of 35% hydrogen peroxide per 100 lbs. dry solids starch is then added, and the agitator turned on low speed. The mixture is allowed to react at 108°–112°F. and the alkali fluidity is monitored every 4 hours, until the target fluidity was reached. When the monitored fluidity does not continue to increase during the course of the reaction, a small additional increment of hydrogen peroxide is added. After the target fluidity is obtained, the reaction mixture is adjusted to a pH of about 11 with the slow addition of 5% sodium hydroxide solution, then the subsequent procedure, including bleaching with sodium hypochlorite and the further starch modification are completed in the usual manner. The product so obtained was comparable in performance to the product which was formerly subjected to acid hydrolysis.

EXAMPLE VI

A starch slurry at approximately 22.5° Be. and 60°F. is placed in a reactor chamber, and the slurry temperature adjusted to 105°–115°F. The pH of the slurry is then adjusted to 4.2 to 4.8 pH with 30° Be. sulfuric acid then 0.03 lbs. of ferrous sulfate pentahydrate per 100 lbs. starch, dry substance, is added to the slurry, and it is stirred for 30 minutes to dissolve the ferrous sulfate pentahydrate. Then 0.43 lbs. of hydrogen peroxide (calculated at 100%) per 100 lbs. of starch (dry solids basis) is added to the slurry. One hour after the hydrogen peroxide addition is completed, the alkali fluidity is measured, and this test is repeated every 30 minutes, following procedure No. 2 set forth below, using a 10 g. sample dry solids starch in 90 ml. of 0.375 N NaOH.

The chart point for the target fluidity is 56 ml., and approximately 8 hours is required to reach the target fluidity. When the target fluidity has been obtained, 0.1 lbs. of sodium bisulfite per 100 lbs. of starch dsb is added, and the slurry is stirred for 15 minutes. The slurry is then adjusted to a pH of 5.0 to 5.5 with 18° Be. soda ash solution. To remove the residual ferrous iron and the resulting color, 0.1% of ethylenediamine tetraacetic acid (EDTA) based on the dry weight of the starch is added to the slurry and it is stirred for 1 hour. The slurry pH is then measured and readjusted to 5.0 to 5.5 as necessary, the resulting slurry is then filtered, washed and dried to about 11.5 to 12.5% moisture. This product proved useful as an adhesive binder.

EXAMPLE VII

A slurry of corn starch at 22.5° Be. and about 60°F. is prepared and adjusted to a temperature of 105°–115°F. The pH of the slurry is adjusted to 4.2 to 4.8 with 30° Be. sulfuric acid, or 18° Be. soda ash, as necessary. 0.025% ferrous sulfate pentahydrate is added, based on the dry weight of the starch, and the mixture is stirred for 15 minutes. 0.33% hydrogen peroxide (100% $H_2O_2$) based on the dry weight of the starch, is then added to the slurry. Starting one hour after the addition of the hydrogen peroxide, the alkali fluidity is monitored every 30 minutes, and charted to a target fluidity of 51 ml. Approximately 8 hours is required to reach the target fluidity. The alkali fluidity procedure No. 1 is followed using a 4.5 g. sample dsb of starch in 95 ml. of 0.25 N sodium hydroxide. When the target alkali fluidity is reached, 0.10% dry sodium bisulfite based on the dry weight of the starch was added to remove any residual hydrogen peroxide, and 0.10% EDTA based on the starch (dsb) was added to remove any residual ferrous sulfate. The slurry is then adjusted to a pH of 6.5 to 7.5 with 18° Be. soda ash and stirred for about 15 minutes.

After the desired hydrogen peroxide thinning is obtained the reaction is continued in the conventional manner to obtain a hydroxyethylated starch product. This product compares satisfactorily to the conventional acid thinned product and is useful in size press applications, and for coating colors in paper manufacture.

In the conventional acid thinning procedure for this product 0.56% total $H_2SO_4$ based on the dry weight of the starch is required to accomplish the desired amount of thinning, whereas only 0.116% total $H_2O_2$ based on the dry weight of the starch is required to accomplish the same purpose here. In addition, the $H_2O_2$ creates no salt by-products which are discharged to the effluent stream.

ALKALI FLUIDITY TESTS

The alkali fluidity tests referred to above have been found to be the most convenient means of monitoring the hydrogen peroxide thinning so that the reaction may be stopped at the desired viscosity. The same equipment is used in all the examples given, although there are variations in the test procedure.

The test is generally described in U.S. Pat. No. 3,238,193 at columns 7 and 8, lines 40–61 and 1–9, respectively. The starch sample size, and the alkalinity level of the starch dispersion are changed as noted to obtain significant readings. Values which are low, and those which are high, are not as definitive as values which are close to midscale.

PROCEDURE NO. 1

The concentration of the alkali starch dispersion for a particular test sample is determined by adding 90–95 ml. of 0.25 N sodium hydroxide to a slurry of neutralized, filtered, water-washed wet starch cake containing the specified grams (5 or 10 g.) of the starch derivative, containing 10% moisture. The sample is slurried in water to make 10 ml. of total sample prior to the addition of the 90–95 ml. of 0.25 N sodium hydroxide. After mixing the starch slurry with the sodium hydroxide solution, the suspension is stirred at between 450 and 460 rpm. for three minutes in order to paste the starch. In procedure Number 1, the pasted sample is then held at 77°F. for thirty minutes. The resulting starch solution is poured into a fluidity funnel having a specific water time between about 37–39 second. The number of milliliters of starch solution which flows through the funnel in the "water-time" (defined below) is the alkali fluidity of the starch. The extent of hydrogen peroxide thinning is monitored by repeating the above test at regular intervals with samples taken from the reaction mixture, and charting to the time at which the desired "target" fluidity will be obtained. At this time, the thinning reaction is stopped, using a peroxide scavenger, such as sodium metabisulfite.

The fluidity funnel used for the alkali fluidity tests described herein comprises two main parts, a funnel body and a funnel tip attached thereto. The funnel body may be stainless steel or glass, and includes a cone shaped portion and a stem portion. A simple plunger-type, tapered valve on a glass rod can be used to manually control flow through the funnel orifice. The stainless steel parts are precision-machined, and all of the parts which come in contact with the test samples are smoothly polished.

The funnel body comprises a generally cone shaped vessel having a 60° taper between opposite, converging funnel walls, and a stem portion integral therewith. The funnel is large enough to hold at least a 100 ml. starch sample, and a 7 mm orifice and fluid passage extend through the stem portion of the funnel to connect to the funnel tip. The fluid passage is 44 mm in length.

The wide end of the funnel body is oriented upwardly, and the tapered valve is inserted downwardly from above into the upper end of the fluid passage to control flow through the orifice during the tests. Operation of this valve to permit flow of the sample through the funnel during the "water-time" (37–39 seconds) of the funnel gives the test readings, which is the amount of sample (in ml.) which has passed through the funnel. The funnel tip is a cup shaped member, which is fastened on the narrow end of the stem portion of the funnel body. The internal chamber of the funnel tip is hemispherical, and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

The composite apparatus described above is vertically disposed above a graduated cylinder for the actual tests. At the beginning of each test, the "water-time" for the apparatus is checked by running 100 ml. of pure water through the funnel and recording the total elapsed time. The "water-time" then becomes the time against which each sample is tested.

The funnel valve is closed, and the sample poured in the funnel body. A small portion of the sample is allowed to flow down through the fluid passage in the stem to fill it prior to the test. Any part of the sample which gets to the beaker is returned to the funnel body.

The valve is then opened and the sample is permitted to flow down through the fluid passage and funnel tip for the period of the actual water time observed and then flow is stopped. The actual flow of the sample through the funnel during the "water-time" is measured in milliliters, and recorded after each test. The funnel is thoroughly washed between each test to avoid irregular observations. In the above test procedure, either a 4.5 g. or 9 g. dry solids starch sample was used in 95 or 90 ml. of 0.25 N NaOH, respectively.

PROCEDURE NO. 2

The same fluidity funnel equipment was used as described above, however, the test sample and procedure are modified as follows. A 9 g. dry solids starch sample was slurried in 90 ml. of 0.375 N NaOH, and stirred for exactly 3 minutes. The sample was not held as above, but was immediately placed in the alkali fluidity funnel, and tested following the procedure already described. The latter procedure is sometimes referred to as the "quick" method, and, depending on values expected, it can be used very effectively to monitor the thinning reaction. The temperature of the funnel, the sodium hydroxide solution temperature, and the alkaline starch sample temperature should all be maintained at 77°F. throughout the tests.

DISCUSSION

The above examples are directed to the presently preferred forms of the invention. It can be appreciated that there are a number of variations possible. Table I below illustrates other possible combinations which have proved effective in thinning starch. The alkali fluidity values given indicate that the various combinations of iron and copper catalysts were effective in thinning the starch in the acid pH range, and the absence of buffers. In all of Samples A-G, the resulting products retained their granular form. Samples H-M in Table II show a further modification of the process, in which the catalysts were chromium and various combinations of cobalt and chromium as indicated. The resulting alkali fluidity values again show the effectiveness of hydrogen peroxide for thinning starch in an acid pH aqueous slurry without buffer salts, and preserving the granular structure of the starch. Little acid is required (only to obtain acidic pH conditions) and neutralization is unnecessary, thereby cutting sewer losses and avoiding the use of soda ash which is presently in short supply.

TABLE I

Peroxide* Thinning of Starch Using Salts of Iron and Copper as Catalysts

| Sample No. | Water | Order and Amount of Additions | | Time, Temp. | Alkali Fluidity | |
|---|---|---|---|---|---|---|
| A | Distilled | Fe, 38 ppm, Cu, 63 ppm, NH$_4$OH pH 8.4, H$_2$O$_2$, 1% | pH 5.8 | 4 hrs., 60° | 10 g | 18 ml |
| B | Distilled | Fe, 38 ppm, Cu, 63 ppm, HNO$_3$ pH 2.8, H$_2$O$_2$, 1% | pH 2.8 | 7 hrs., 60° | 10 g | 75 ml |
| C | Tap | Fe, 38 ppm, Cu, 63 ppm, HCl pH 2.9, H$_2$O$_2$, 1% | pH 2.9 | 7 hrs., 60° | 10 g | 65 ml |
| D | Tap | Fe, 20 ppm, Cu, 32 ppm, HCl pH 2.9, H$_2$O$_2$, 1% | pH 2.9 | 7 hrs., 60° | 10 g | 20 ml |
| | | | | | 5 g | 59 ml |
| E | Tap | HCl, pH 3.9, H$_2$O$_2$, 1%, Fe, 38 ppm, Cu, 63 ppm | pH 2.9 | 8 hrs., 60° | 10 g | 72 ml |
| F | Tap | Fe, 38 ppm, Cu, 63 ppm, H$_2$O$_2$, 0.25%, HCl pH 3.8 | pH 3.5 | 8 hrs., 60° | 5 g | 52 ml |
| G | Tap | H$_2$O$_2$, 0.5%, Fe, 38 ppm, Cu, 63 ppm, HCl pH 3.8 | pH 3.2 | 8 hrs., 60° | 10 g | 45 ml |

*H$_2$O$_2$ solution containing 30% H$_2$O$_2$.

TABLE II

Peroxide* Thinning of Starch at Slightly Acid pH Values Using a Cobalt Salt and Sodium Dichromate Catalysts

| Sample No. | Water | Order and Amounts of Additions | Time, Temp. | Alkali Fluidity | |
|---|---|---|---|---|---|
| H | Distilled | $H_3PO_4$, pH 3.5 Cr, 350 ppm, $H_2O_2$, 1% | 4 hrs., 65° | 10 g | 54 ml |
| I | Distilled | $H_2O_2$, 1%*, Co, 2.4 ppm Cr, 70 ppm, pH 4.5 | 6 hrs., 60° | 10 g | 38 ml |
| J | Tap | $H_2O_2$, 1%, Co, 5 ppm Cr, 70 ppm, pH 4.9 | 7.2 hrs., 60° | 10 g | 38 ml |
| K | Tap | $H_2O_2$, 2%, Co, 5 ppm Cr, 70 ppm, pH 5.0 | 7.5 hrs., 60° | 10 g | 45 ml |
| L | Distilled | $HNO_3$, pH 3.3, Co, 2 ppm (Cr, 35 ppm, + $H_2O_2$, 1%) | 7 hrs., 60° | 10 g | 5 ml |
| M | Tap | $HNO_3$, pH 1.7, $H_2O_2$, 1%, Cr, 175 ppm Co, 12 ppm, Cr, 175 ppm | 7.5 hrs., 60° | 5 g | 80 ml |

*$H_2O_2$ solution containing 30% $H_2O_2$.

Since many embodiments of this invention may be made and since many changes may be made in the embodiments described, the foregoing is interpreted as illustrative and the invention is defined by the claims appended hereafter.

We claim:

1. A process for thinning granular starch with hydrogen peroxide in the absence of buffering agents, the steps comprising, preparing an acidic pH aqueous slurry of said granular starch at a temperature below the gelatinization temperature of said starch, adding a minor amount of heavy metallic salt to provide a metal cation catalyst to said slurry, the metal cation catalyst being selected from the group consisting of iron, cobalt, copper, chromium and combinations thereof, and adding a minor amount of hydrogen peroxide to said aqueous slurry, said hydrogen peroxide being added in an amount sufficient to effect a thinning reaction to obtain the desired thinning without solubilizing the starch, whereby the pH of said aqueous slurry continues to decrease to a more acid condition during the thinning reaction.

2. The method of claim 1, including the step of stopping the hydrogen peroxide action at the desired thinning level by adding a peroxide scavenger to the aqueous slurry.

3. The method of claim 2, in which the peroxide scavenger is sodium metabisulfite, and including the additional step of removing residual ferrous sulfate by adding ethylenediamine tetraacetic acid.

4. The method of claim 1, in which the heavy metal cation catalyst is iron.

5. The method of claim 4, in which the iron salt catalyst is added in the form of ferrous sulfate.

6. The method of claim 4, in which the iron salt catalyst comprises about 0.02% to 0.10% by weight of ferrous sulfate pentahydrate based on the dry weight of the starch added to the aqueous starch slurry to catalyze the hydrogen peroxide thinning of the starch.

7. The method of claim 1, in which about 0.01% of 1.0% of undiluted hydrogen peroxide based on the dry weight of the starch is added to the aqueous slurry to thin the starch in self adjusting, acid pH conditions.

8. The method of claim 1, including the steps of subsequently gelatinizing and drying the thinned starch product.

9. The method of claim 1, in which the heavy metal cation catalysts are cobalt and chromium and the pH is about 4–5.

10. The method of claim 1, in which the heavy metal cation catalyst is chromium and the pH is about 4–5.

11. The method of claim 1, in which the heavy metal cation catalyst is about 2 ppm cobalt in combination with about 35 ppm chromium, the pH is about 3–4 and using about 1% by weight hydrogen peroxide (calculated at 100%) based on the dry weight of the starch.

* * * * *